United States Patent
Heinrich

(10) Patent No.: US 9,092,611 B1
(45) Date of Patent: Jul. 28, 2015

(54) ADAPTIVE, MULTI-LEVEL SECURITY FOR FLIGHT DECK APPLICATIONS HOSTED ON MOBILE PLATFORMS

(75) Inventor: Richard E. Heinrich, Marion, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 87 days.

(21) Appl. No.: 13/493,473

(22) Filed: Jun. 11, 2012

(51) Int. Cl.
| | | |
|---|---|---|
| G06F 21/00 | (2013.01) | |
| G06F 21/44 | (2013.01) | |
| G06F 21/12 | (2013.01) | |
| G06F 21/10 | (2013.01) | |
| G06F 21/60 | (2013.01) | |
| H04W 12/08 | (2009.01) | |
| H04L 29/08 | (2006.01) | |
| G06F 21/31 | (2013.01) | |

(52) U.S. Cl.
CPC ............. G06F 21/44 (2013.01); G06F 21/10 (2013.01); G06F 21/121 (2013.01); G06F 21/60 (2013.01); H04L 67/12 (2013.01); H04W 12/08 (2013.01); G06F 21/31 (2013.01)

(58) Field of Classification Search
CPC ......... G06F 21/10; G06F 21/31; G06F 21/44; G06F 21/60; G06F 21/121; H01L 67/12; H04W 12/008
USPC .................... 726/2, 6, 26, 27, 28, 29; 713/168
See application file for complete search history.

(56) References Cited

U.S. PATENT DOCUMENTS

| | | | |
|---|---|---|---|
| 6,308,275 B1* | 10/2001 | Vaswani et al. | 726/2 |
| 7,111,164 B2* | 9/2006 | Kinoshita | 713/166 |
| 8,462,018 B1* | 6/2013 | Shepherd et al. | 340/945 |
| 2002/0111720 A1* | 8/2002 | Holst et al. | 701/3 |
| 2003/0139135 A1* | 7/2003 | Rossi | 455/3.04 |
| 2006/0229772 A1* | 10/2006 | McClary | 701/3 |
| 2007/0027589 A1* | 2/2007 | Brinkley et al. | 701/3 |
| 2007/0214360 A1* | 9/2007 | Royalty | 713/168 |
| 2008/0052517 A1* | 2/2008 | Anstey et al. | 713/176 |
| 2009/0052370 A1* | 2/2009 | Leclercq et al. | 370/316 |
| 2009/0082013 A1* | 3/2009 | Eckert et al. | 455/431 |
| 2009/0129594 A1* | 5/2009 | Weissman et al. | 380/255 |
| 2009/0183228 A1* | 7/2009 | Dasch et al. | 726/1 |
| 2009/0189785 A1* | 7/2009 | Kravitz et al. | 340/945 |
| 2010/0077467 A1* | 3/2010 | Satagopan et al. | 726/7 |
| 2010/0131149 A1* | 5/2010 | Saugnac et al. | 701/33 |
| 2011/0218701 A1* | 9/2011 | Ric et al. | 701/33 |
| 2012/0066751 A1* | 3/2012 | Nutaro et al. | 726/7 |
| 2013/0080839 A1* | 3/2013 | Gin | 714/45 |

* cited by examiner

Primary Examiner — Sarah Su
(74) Attorney, Agent, or Firm — Angel N. Gerdzhikov; Donna P. Suchy; Daniel M. Barbieri

(57) ABSTRACT

A mobile computing platform for processing data in an environment requiring multiple levels of authentication may include processes to authenticate various applications at each of the multiple levels. The mobile computing platform may integrate with aircraft avionics to provide data from applications to a certified avionics system.

20 Claims, 2 Drawing Sheets

ADAPTIVE, MULTI-LEVEL SECURITY FOR FLIGHT DECK APPLICATIONS HOSTED ON MOBILE PLATFORMS

FIELD OF THE INVENTION

The present invention is directed generally toward security for mobile platforms and more particularly to mobile devices in systems having multiple security levels.

BACKGROUND OF THE INVENTION

Tablet and portable computing devices are taking on more of an operational display and pilot interface role. These devices are being used to display operational data instead of static, paper-like data, and will likely utilize commercial networks for data gathering prior to use in decision making.

The proliferation of highly portable, tablet and portable computing devices for use on the flight deck necessitates some level of security for data exchange. Because portable computing devices will be utilized across many classes of users and will handle information with varying degrees of integrity, there is a need for a dynamic level of security management.

When transferring or processing data from certified avionics platforms and other data from uncertified systems, some level of data protection must be available; for example, when integrating own ship position on stored maps and possibly other traffic data. For general aviation users there is a need for some rudimentary level of secure data exchange. This requirement will increase when the data from more capable flight decks (e.g. business or air transport category platforms) are integrated.

Consequently, it would be advantageous if an apparatus existed that is suitable for authenticating data or applications with a mobile computing platform for use in a system consisting of certified avionics.

SUMMARY OF THE INVENTION

Accordingly, the present invention is directed to a novel method and apparatus for authenticating data or applications with a mobile computing platform for use in a system consisting of certified avionics. There is a need to accommodate different levels of data authentication and scalable levels of security depending on the application hosted on the mobile computing platform and how it is intended to be interfaced to the certified avionics system.

One embodiment of the present invention is a mobile computing platform configured to qualify data from one or more applications for integration into a certified avionics system. The mobile platform may comprise one or more background processes capable of authenticating data or applications with regards to one or more security levels.

Another embodiment of the present invention is an avionics system including a mobile platform having processes configured to authenticate data or applications. The avionics system may utilize the mobile platform to send or receive data useful to onboard aviation systems.

The present invention teaches a multi-level adaptive security structure. The adaptive nature of the system supports different classes of users in different operational domains. A "security application" is a gateway function to allow third-party applications to integrate with on-board certified systems. The gateway function must be flexible enough to provide a secure interface for different levels of applications and services.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Reference will now be made in detail to the subject matter disclosed, which is illustrated in the accompanying drawings. The scope of the invention is limited only by the claims; numerous alternatives, modifications and equivalents are encompassed. For the purpose of clarity, technical material that is known in the technical fields related to the embodiments has not been described in detail to avoid unnecessarily obscuring the description.

Electronics systems in aircraft (avionics) are critical to modern aviation. Avionic systems include communications, navigation, display and management of multiple systems and the hundreds of systems that are fitted to aircraft to meet individual roles. Avionic systems are generally certified to certain standards to insure the safety and reliability of the systems.

Mobile computing platforms such as laptop computers, tablets and smartphones are more generalized devices that execute any number of software applications. Some software applications designed for execution by mobile computing platforms may perform avionics type functions; such as collecting data from an aircraft, transmitting data about an aircraft, and receiving data for use by an aircraft.

Applications for mobile computing platforms may not be subject to the same standards as avionic systems. Furthermore, the rapid development of mobile computing platforms and applications, as compared to the development and vetting of avionic systems, ensures that some applications may never meet the safety and reliability standards required by avionic systems. The present invention teaches a system and method for safely and reliably integrating data and applications executed on a mobile platform into aircraft avionics.

Figure 1:
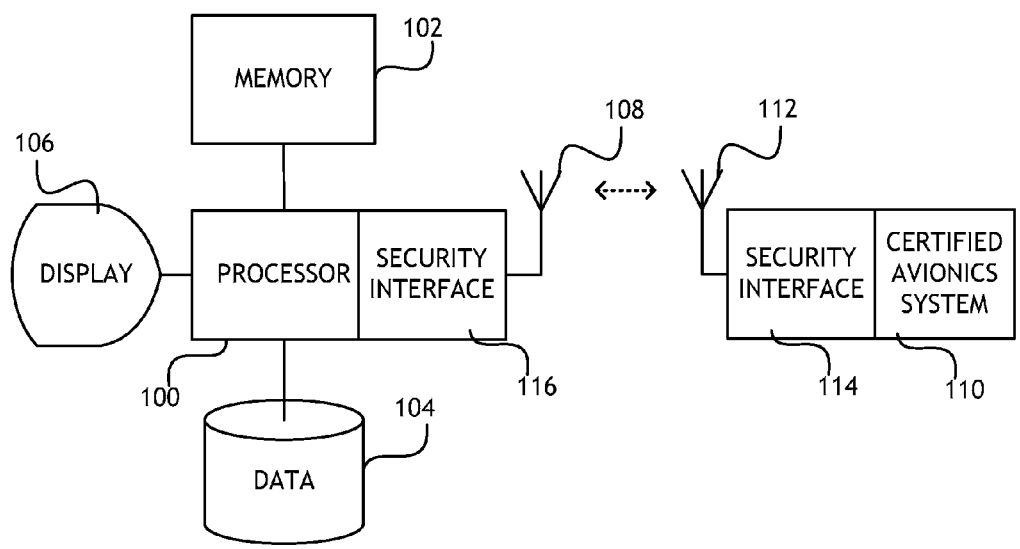
FIG. 1 shows a block diagram of a mobile platform for authenticating applications or data transfers in an avionics environment.

Referring to FIG. 1, a block diagram of a mobile platform for authenticating applications or data transfers for use in an avionics environment is shown. The mobile platform may include a processor 100. The processor 100 may be connected to a memory 102. The processor 100 may also be connected to a data storage 104 such as a hard disk drive (HDD) or a solid state drive (SSD). The processor 100 may be connected to a display 106. The display 106 may further comprise an input device such as a touch sensitive film. The processor 100 may also be connected to a network connection device 108 such as a Wi-Fi antenna or some physical connection configured to conform to some computer communication protocol.

The processor 100 may execute applications configured to process data relevant to aircraft avionics. For example, the processor 100 may execute applications configured to collect data such as flight dispatch or on-line flight planning. The processor 100 may execute applications configured to collect data through the network connection device 108. The processor 100 may also execute applications configured to connect to a computer network such as the Internet. Connection to a computer network may require distinct security protocols and authentication as compared to collecting data. The processor 100 may further execute applications configured to connect to a certified avionics system 110 through a network connection device 112, which may require another distinct security protocol and authentication. Where the processor 100 is simultaneously connected to a certified avionics system 110 and a computer network, there is a risk to the certified avionic system 110. Such risks may necessitate a security interface 114, 116 or "firewall" between the application and the certified avionics system 110 to isolate the mobile computing platforms ability to extract data from the certified avionics system 110. Such a security interface 114, 116 may be incorporated into the certified avionics system 110, or it may be executed by the processor 100, or both. In either case, the security interface 114, 116 may be a hardware appliance or software application.

The processor 100 may also execute applications configured to upload data to the certified avionics system 110, or allow the certified avionics system 110 to download data from the mobile computing platform. Because the certified avionics system 110 is generally subject to certification, receiving data from an uncertified system creates additional risk; therefore, an additional level of security and authentication may be required. Finally, the processor 100 may execute applications configured to process or manipulate data from the certified avionics system 110 or from the computer network, and share such manipulated data. Manipulation and sharing may require another level of security and authentication.

To accommodate potentially disparate levels of security and authentication, the processor 100 may identify the level of security or authentication required for a particular application or data transfer. Levels of security and authentication may be identified based on the nature of the systems accessed by an application or the nature of the data being transferred. For example, connection to the Internet may indicate a certain level of authentication as compared to a connection to a local network. Levels of security may also be defined by a system that the application is trying to connect to. For example, a Wi-Fi device may define a security protocol. The processor 100 may identify the appropriate authentication level whether authentication is defined by the mobile computing platform or by some other connected system.

The processor 100 may then authenticate the particular application to connect to a computer network, connect to a certified avionics system 110, transfer data, perform data manipulation or any other task requiring authentication based on the identified authentication level. The processor 100 may ask a user to provide appropriate credentials for a particular authentication level, or reference one or more credentials stored in the data storage 104 or located in the memory 102. Where a particular application or data transfer requires more than one level of authentication, the processor 100 may reference stored credentials for one or more levels of authentication and ask a user to provide any additional levels of authentication, or the processor 100 may identify the levels of authentication as subsets of the highest level of authentication, in which case the processor 100 may ask a user to provide only the highest level of authentication.

When a user provides credentials for a level of authentication, the processor 100 may store such credentials in the data storage 104 or in the memory 102. The processor 100 may maintain stored credentials indefinitely or for some period of time.

The processor 100 may allow applications to interact with computer networks or a certified avionics system 110, or transfer and process data for any authentication level for which appropriate credentials have been provided. The processor 100 may prohibit any action requiring an authentication level for which appropriate credentials have not been provided.

A device according to this embodiment may allow data and applications executing on a mobile platform to safely integrate data and applications into an otherwise self-contained certified avionics system 110.

One skilled in the art may appreciate that "processor" in the context of the present invention may include a single processor, a single central processing unit having more than one processing core or a processing unit in a system having a plurality of processing units.

Figure 2:
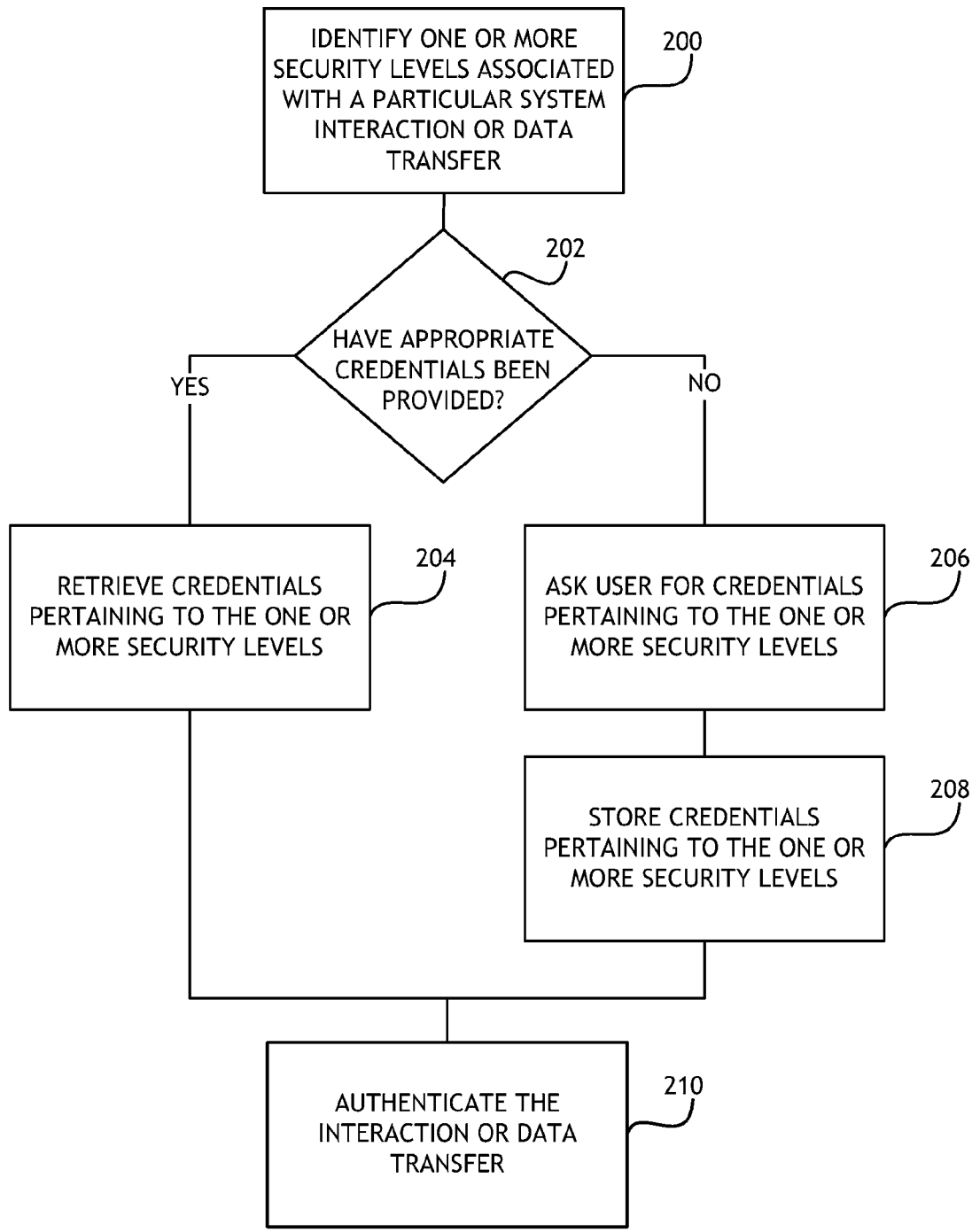
FIG. 2 shows a flowchart of a method for authenticating applications or data transfers in an avionics environment.

Referring to FIG. 2, a flowchart of a method for authenticating applications or data transfers in an avionics environment is shown. A mobile computing platform including at least one processor may execute one or more applications to produce data for, or directly interact with, a certified avionics system. The processor may execute a process to identify 200 one or more security levels associated with a data transfer or system in an aircraft. The processor may then determine 202 if credentials pertaining to the one or more security levels has already been provided. If the processor has access to appropriate credentials, the processor may retrieve 204 the credentials and authenticate 210 the interaction or data transfer. Where a particular interaction or data transfer implicates more than one level of security, the procedure of determining 202, retrieving 204 and authenticating 210 may be repeated as appropriate.

If the processor does not have access to appropriate credentials, the processor may ask 206 a user, through a display device, to provide credentials pertaining to the one or more security levels. The processor may store 208 the provided credentials for later retrieval if a corresponding security level is implicated by a different interaction or data transfer. The processor may then authenticate 210 the interaction or data transfer. Where a particular interaction or data transfer implicates more than one level of security, the procedure of determining 202, asking 206, storing 208 and authenticating 210 may be repeated as appropriate. Furthermore, where a particular interaction or data transfer implicates more than one level of security, some credentials may be stored while others may not. In that case certain credentials may be retrieved 204 while others may be acquired by asking 206.

Where credentials for a particular security level cannot be retrieved 204 and are not forthcoming from a user, the processor may not authenticate the interaction or data transfer, or some portion of the interaction or data transfer specifically requiring authentication for which credentials are not available.

By the apparatus and methods of the present invention, the integrity of a certified avionic system may be maintained. Mobile computing platforms may be safely employed to perform data manipulation and transfer in an avionics environment.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A mobile computing platform comprising:
a processor;
memory connected to the processor;
a security interface interposed between the processor and a certified avionics system, the security interface configured to isolate the processor from the certified avionics system and restrict the processor's ability to extract data from the certified avionics system; and
computer executable program code configured to execute on the processor,
wherein the computer executable program code is configured to:
identify one or more security levels, each of the one or more security levels defined by the nature of a network connected system, each of the one or more security levels further associated with at least one of a system interaction, a data transfer or a data manipulation being attempted by an application, the application being configured to interact with the certified aircraft avionics system;
authenticate the application to allow the certified avionics system to download data from the mobile computing platform; and
restrict the application from allowing the certified avionics system to download data from the mobile platform; and
wherein the one or more security levels ensure that the application conforms to one or more avionic system certification standards.

2. The mobile computing platform of claim 1, further comprising a network connection device connected to the processor.

3. The mobile computing platform of claim 2, wherein the network connection device is configured to connect to the certified aircraft avionics system.

4. The mobile computing platform of claim 3, wherein the one or more security levels includes a security level associated with data transfer to the certified avionics system.

5. The mobile computing platform of claim 1, further comprising a data storage, wherein the data storage is configured to store one or more credentials pertaining to the one or more security levels.

6. The mobile computing platform of claim 5, wherein the computer executable program code is further configured to:
determine if a credential is stored in the data storage; and
retrieve the credential stored in the data storage.

7. The mobile computing platform of claim 5, wherein the computer executable program code is further configured to:
ask a user to provide a credential;
receive the credential from the user; and
store the credential in the data storage.

8. The mobile computing platform of claim 7, wherein the computer executable program code is further configured to delete the one or more credentials stored in the data storage when a period of time has elapsed.

9. The mobile computing platform of claim 1, wherein the computer executable program code is further configured to prohibit the application from performing the at least one of a system interaction, the data transfer or the data manipulation requiring the one or more security levels.

10. A method of authenticating an application in a mobile computing platform comprising:
identifying one or more security levels, each of the one or more security levels defined by the nature of a network connected system, each of the one or more security levels further associated with at least one of a system interaction, a data transfer or a data manipulation being attempted by the application, the application being configured to interact with a certified aircraft avionics system;
isolating the mobile computing platform from the certified avionics system to restrict the mobile computing platform's ability to extract data from the certified avionics system; and
authenticating the application to allow the certified avionics system to download data from the mobile computing platform;
restricting the application from allowing the certified avionics system to download data from the mobile platform; and
wherein the one or more security levels ensure that the application conforms to one or more avionic system certification standards.

11. The method of claim 10, wherein the system interaction comprises a connection to a certified aircraft avionics system.

12. The method of claim 11, wherein the one or more security levels includes a security level associated with data transfer to the certified avionics system.

13. The method of claim 10, further comprising:
determining if a credential is stored in a data storage; and
retrieving the credential stored in the data storage.

14. The method of claim 10, further comprising:
asking a user to provide a credential;
receiving the credential from the user; and
storing the credential in a data storage.

15. The method of claim 14, further comprising deleting one or more credentials stored in the data storage when a period of time has elapsed.

16. The method of claim 10, further comprising prohibiting the application from performing the at least one of the system interaction, the data transfer or the data manipulation requiring the one or more security levels.

17. An avionics system comprising:
a processor configured to:
connect to a mobile computing platform; and
receive data from an application executing on the mobile computing platform; and
a security interface interposed between the processor and the mobile computing platform, the security interface configured to isolate the processor from the mobile computing platform and restrict the mobile computing platform's ability to extract data from the avionics system,
wherein the mobile computing platform is configured to:
authenticate the application for connection to one or more elements in the avionics system, wherein each of the one or more elements in the avionics system requires a certification level and allow the avionics system to download data from the mobile computing platform;
identify one or more security levels defined by the nature of each of the one or more elements, each of the one or more security levels further associated with at least one of a system interaction, a data transfer or a data manipulation being attempted by the application, the application being configured to interact with a certified aircraft avionics system.

18. The avionics system of claim 17, wherein at least one of the one or more elements in the avionics system is configured to interact with the application.

19. The avionics system of claim 17, further configured to send data to the application executing on the mobile computing platform, wherein the mobile computing platform is configured to authenticate the application to receive such data.

20. The avionics system of claim 19, wherein the sent data comprises at least one of flight dispatch data and flight planning data.

\* \* \* \* \*